April 28, 1959   R. M. P. O. RICHARD-FOY   2,884,533
MEASURING APPARATUS FOR IONISING RADIATIONS
Filed March 23, 1956   3 Sheets-Sheet 1

Robert M. P. O. Richard-Foy,
by Mauro & Lewis, attys.

Robert M. P. O. Richard-Foy,
by Mauro & Lewis, attys.

United States Patent Office 2,884,533
Patented Apr. 28, 1959

2,884,533

MEASURING APPARATUS FOR IONISING RADIATIONS

Robert M. P. O. Richard-Foy, La Celle-Saint-Cloud, France, assignor to Association des Ouvriers en Instruments de Precision (A.O.I.P.) (Société Anonyme Cooperative a Capital Variable), Paris, France, a French company Application March 23, 1956, Serial No. 573,366

Claims priority, application France March 28, 1955

6 Claims. (Cl. 250—83.3)

The characteristics of ionising radiations are usually measured by the electric charges which these radiations free in ionisation chambers. The total "quantity" of ionising radiations received during a given time may be measured for example by means of instruments of the electrostatic type, by evaluating by means of an electrometer, the total discharge of an ionisation chamber during this given time.

In the same way, the intensity of these radiations can be obtained by the instantaneous measurement of the discharge current of an ionisation chamber of this kind. To this end, it is known to cause this current to pass through a resistance of high value so as to cause a difference of potential to appear at the terminals of the resistance, this potential being measurable by suitable instruments (electronic amplifiers, electrometers, etc.).

The present invention relates to instruments which are capable of measuring the intensities of ionising radiations and also if so required, the quantities received during a pre-determined time.

In accordance with the invention, the apparatus for measuring ionising radiations comprises a high-tension source of known potential to the terminals of which are connected in series a resistance of high value and an electrometer comprising two electrodes insulated from each other but movable with respect to each other, across the terminals of the electrometer being connected a member sensitive to ionising radiations and adapted under the influence of these radiations to cause a flow of current between these terminals which flow is a function of the intensity of the said radiations.

In a first form of embodiment of the invention, this member sensitive to ionising radiations is a closed chamber containing the electrodes of the electrometer, the said chamber itself forming an ionisation chamber and having its wall connected to one of the said electrodes while the other electrode is insulated from the said wall.

In a further form of embodiment of the invention, which is more particularly applicable to the measurement of low-intensity fields of radiation, this member is independent of the chamber which contains the electrodes of the electrometer. In particular, this independent member may be a Geiger-Müller counter chosen in accordance with the nature of the radiations to be measured ($\alpha$, $\beta$ or $\gamma$ radiations, or neutrons), the two electrodes of this counter being respectively connected to the electrodes of the electrometer.

In an apparatus of this kind, if V is the potential of the high-tension source, R is the value of the resistance and $i$ the intensity of the current produced by the charges set free by the radiations, a potential V—R$i$ applied between the electrodes of the electrometer, that is to say a potential which, given that V and R are constant, only depends on the value of the current and thus on the intensity of the radiations. The deflection of the electrometer thus gives a direct measure of the intensity of the radiations.

In addition, since when the intensity is zero, the full potential of the source is applied to the electrometer, the measurement is effected starting from the full charge of the electrometer in the direction of decreasing potentials, that is to say in the best conditions of sensitivity of an apparatus of this kind.

In a preferred form of embodiment of the invention, the source of continuous high tension is constituted by a charged condenser which discharges slowly across the said resistance and the parallel connection of the said electrometer and the member which is sensitive to the radiations.

It will be shown during the course of the description which follows, that a very large number of measurements can be carried out in this way, not only without it being necessarfy to re-charge the condenser but also without the accuracy of the measurements being substantially affected in time.

For the measurement of the total quantity of radiations received during a pre-determined time, the said charged condenser or an auxiliary condenser may be employed by putting the high resistance out of circuit for the application of potential to the electrometer and to the member which is sensitive to the ionising radiations, so that the discharge of the said condenser, which discharge is measured by the electrometer, gives an indication of the total quantity of radiations received. In this way, the apparatus then functions as a quantity meter.

By using an auxiliary condenser, it is possible to produce an apparatus adapted to measure by its continuous operation the total quantity of radiations received and, by the use of a reversing contact, to measure from time to time the instantaneous intensity of the said radiations.

If a single charged condenser is used, it is possible, by means of a reversing switch adapted to short-circuit the resistance, to measure either the intensity (when this resistance is in circuit), or the quantity (when the said resistance is short-circuited).

The description which follows below with reference to the attached drawings (which are given by way of example only and not in any sense by way of limitation) will make it quite clear how the invention may be carried into effect, the special features which are brought out, either in the drawings or in the text, being understood to form a part of the said invention.

Figure 1:
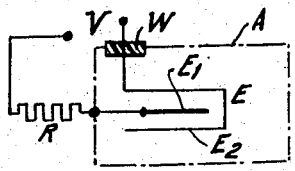
Fig. 1 is the most simple form of diagram of a measuring apparatus for the intensity of radiations in accordance with the invention.

In the diagram of Fig. 1, E is an electrometer having two electrodes $E_1$ and $E_2$ insulated from each other but movable with respect to each other, the electrodes being enclosed in a chamber A of conducting material. One of the electrodes $E_2$ of this electrometer is connected to one of the terminals of a direct current source of high potential V of constant voltage; the other electrode $E_1$ is connected through the medium of a high resistance R to the other terminal of this source. One of the electrodes $E_2$ is connected to the wall of the chamber A whilst the conductor which is connected to the other electrode passes into this chamber through an insulating plug W.

In this case, the chamber A forms the ionisation chamber. In fact, the ionising particles generate ions in the atmosphere of the chamber, and these ions provide a conducting path between the electrodes $E_1$ and $E_2$ of the electrometer and between the wall of the chamber A and the insulated electrode $E_2$. There is thus produced a leakage of current between the electrodes which tends to discharge the electrometer.

The deflection of the electrometer E is a function of the potential which is applied to it, that is to say of $V-Ri$, where $i$ is the intensity of the current due to the charges liberated by the action of the ionising radiations. For a pre-determined value of V and a suitable calibration, the intensity of the ionising radiations to which the apparatus is exposed can be read-off directly on the electrometer.

Figure 2:
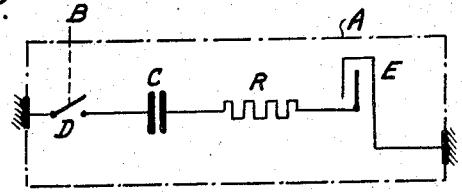
Fig. 2 shows the modification made to this diagram for the case in which the high-tension source of current is a condenser.

As shown in Fig. 2, the source V may be constituted by a charged condenser C. The whole of the apparatus is enclosed in a chamber A which is filled with a fluid having dielectric properties as perfect as possible (dryness).

Inside this chamber of conducting material are enclosed the electrometer, the resistance R, the condenser C and, when this is provided, a switch D which can be operated from outside the chamber. (An example of a switch of this kind will be described with reference to Fig. 6.) All these members are connected in series between the conducting walls of the chamber. In addition, means are provided to enable the condenser C to be charged to a pre-determined potential; these means may be constituted in known manner by a plug of conducting rubber surrounded by insulation, which closes an opening in the wall of the chamber A, the deformation of the plug rendering it possible to make contact with the part of the circuit which is capacitatively insulated in the chamber A (that is to say the part of the circuit comprised between the condenser C and the electrometer E).

An apparatus of this kind is adapted to give, over an appreciable period and without re-charging the condenser, precise indication of the intensity of the radiations to which it is exposed.

In fact, if it is assumed that the condenser C has a capacity of 0.5 $\mu$F and that there is applied thereto a potential of 450 volts; its charge will thus be $$0.5 \times 10^{-6} \times 450 = 2.25 \times 10^{-4} \text{ coulomb}$$

The value of the resistance R is of the order of $10^{10}$ to $10^{11}$ ohms or, for example, $10^{11}$ ohms.

Even if it is supposed that the intensity of the radiations received is so great that the electric charges which it sets free in the electrometer E and in the chamber A practically cause the electrometer to be short-circuited, the intensity of the current in the circuit will be an absolute maximum of $4.5 \times 10^{-9}$ amperes.

Now, in order to cause the charge of the condenser to vary by 1%, it will be necessary for this intensity to carry $2.25 \times 10^{-6}$ coulomb which require 500 seconds or almost 10 minutes. As by the operation of the switch D each measurement only requires a few seconds, a large number of measurements can be effected without their precision being substantially affected.

In addition, it will be noted that for the intensity of radiation considered, an exposure of the operator to such radiation for a period of 500 seconds would correspond to a fatal dose.

Figure 3:
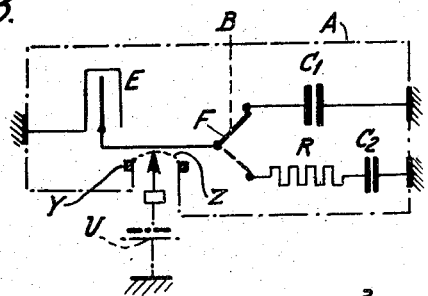
Fig. 3 is the diagram of a mixed apparatus adapted to measure both the quantity and the intensity of the radiations.

As shown in Fig. 3, by means of a change-over switch F enabling the electrometer to be connected alternatively either to a condenser $C_1$, or to a condenser $C_2$ in series with a resistance, it is possible with a single electrometer to obtain any apparatus which measures either the overall quantity of ionising radiations received in a pre-determined time, or the intensity of the said radiations.

Figure 6:
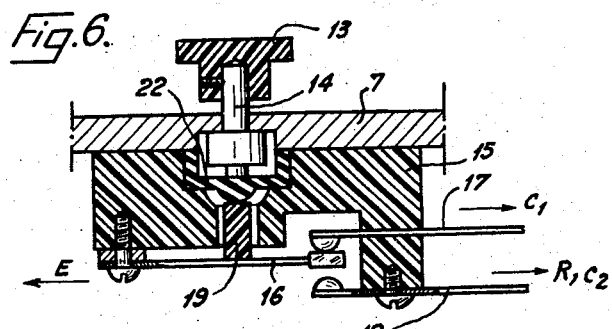
Fig. 6 shows a cross-section of a detail of Fig. 5.

As will be shown with reference to Fig. 6, the change-over switch F may be arranged so as normally to be in the position shown in full lines and by the momentary control of a button B, to be brought into the position shown in dotted lines. In this figure, the source U has also been shown in dotted line, this source enabling the two condensers $C_1$ and $C_2$ to be successively charged by the operation of the button B through the plug of conducting rubber Z insulated by the ring Y.

In these conditions, the apparatus records the quantity received during the whole period of ionisation reduced by the time necessary for making the measurements of intensity. Since these measurements of intensity are only effected from time to time, the condenser $C_2$ is not discharged in the interval between these measurements. It is thus possible to give $C_2$ fairly low values of capacity.

By way of example, for an electrometer having an inherent capacity of 20 pF, the condenser $C_1$ can be given a capacity of 10,000 pF which, for an initial charge of 450 volts corresponds to a measurable quantity of about 100 Roentgen. In this case, the condenser $C_2$ can be given a capacity of 0.5 $\mu$F.

As indicated above, several hundred measurements of intensity can be carried out with very good accuracy, whilst at each of these measurements, the measured quantity is hardly affected except by a value of $$\frac{2}{1,000}$$

which is the ratio of the inherent capacity of the electrometer to the capacity of the condenser $C_1$. An accuracy of between 1 and 2% is thus possible with both types of measurement.

Figure 4:
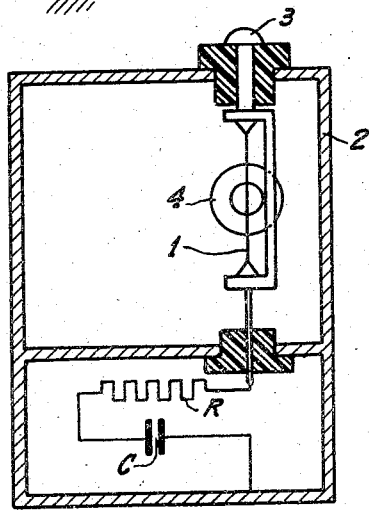
Fig. 4 shows the application of the invention to the case of a wire electrometer.

In the apparatus shown in Fig. 4, the electrometer comprises a stretched quartz thread 1 housed inside a chamber 2. The charge can be applied to this electrometer through the terminal 3. The deflection of the quartz thread can be observed by means of the microscope 4. The resistance R and the condenser C are enclosed in a separate compartment which may have provision for it to be opened so that it is possible to change these members.

This apparatus is charged at the moment of its use and the deflection of the thread 1, observed in front of a suitable graduated scale, continuously indicates the value of the intensity.

Figure 5:
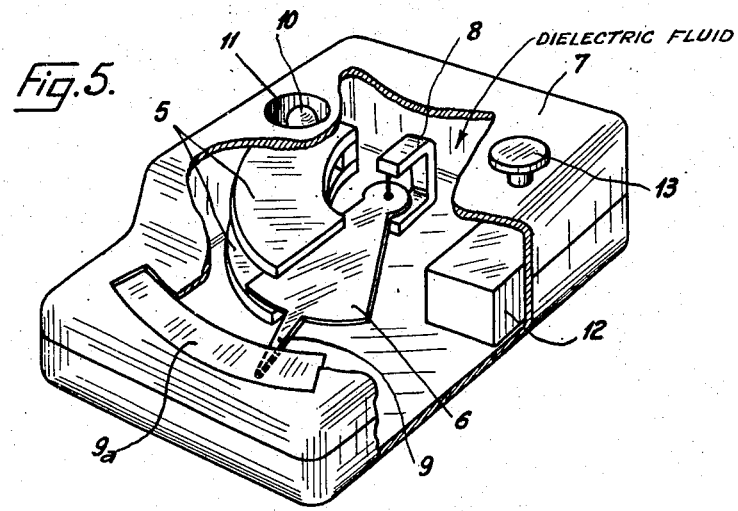
Fig. 5 shows a diagrammatic perspective view of an apparatus in accordance with the diagram of Fig. 3 and comprising a quadrant electrometer.

In the form of embodiment shown in Fig. 5, the electrometer comprises fixed quadrants 5 which are insulated, and between which moves the vane 6 which is electrically connected to the casing 7 through its suspension 8. This vane is provided with a needle 9 which, during the movement of the vane, travels in front of a graduated scale visible through the window 9a.

The button 10 of conducting rubber, mounted in an insulating member 11 which forms a part of the wall of the casing, enables the fixed quadrants 5 and in consequence the internal members of the casing which are coupled to the quadrants and which, like the latter, are capacitatively insulated from the casing, to be charged from the exterior. These internal members, which are the condensers $C_1$ and $C_2$ and the resistance R are housed in the space 12; the button 13 corresponds to the button B of the diagram of Fig. 3.

The button 13 (see Fig. 6) is rigidly fixed to a push-rod 14 which passes through the wall 7 and terminates in a dished member 22 of insulating rubber which closes the passage opening in the wall. This bowl 22 is housed in an insulating block 15 which carries the elastic blades 16, 17 and 18; and insulating finger 19 is arranged between the bottom of the bowl 22 and the blade 16. In the absence of any pressure on the button 13, the blades 16 and 17 are in contact (which connects the electrometer E with $C_1$); when the button 13 is depressed, the bottom of the bowl is deformed, it forces inwards the finger 19 and the blade 16 so as to cause the latter to make contact with the blade 18 (which connects the electrometer with $C_2$ and R).

When an electrometer is used, and especially a quadrant electrometer, as an ionisation chamber, this chamber comprises two parts: a fixed part constituted by the chamber enclosing the electrometer and the fixed quadrants; and a variable part constituted by these fixed quadrants and the moving vane. In the case of a quadrant electrometer, the influence of this second part is proportional to the width of the moving vane comprised between the fixed quadrants, that is to say to the angle $\theta_0 - \theta$ where $\theta$ is the deflection of the vane starting from the charged condition of the electrometer, and $\theta_0$ is the maximum deflection of this vane when the electrometer is in the completely discharged state. For a given deflection $\theta$ of the electrometer, the sensitivity of the apparatus is thus proportional to $A + B (\theta_0 - \theta)$, where A is the influence of the constant portion of the ionisation chamber and B $(\theta_0 - \theta)$ is the influence of the variable portion. For constituent materials of the same nature, A and B will depend on the geometric characteristics of the apparatus. The sensitivity S thus diminishes as the deflection increases and, in consequence, the interval between successive graduations corresponding to equal variations of the magnitude measured becomes progressively smaller as the deflection increases.

When using an electrometer as an ionisation chamber, it is thus possible to sweep a zone of variation of the measured quantity which is greater than when a separate ionisation chamber is employed with the same electrometer, and in addition, it is possible to choose and to adapt the sensitivity of this electrometer to the zone of measurement to be effected.

Figure 7:
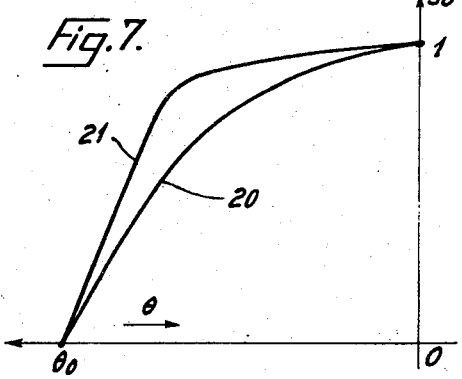
Fig. 7 is a curve which illustrates a property of the apparatus in accordance with the invention.

Thus, in the diagram shown in Fig. 7, in which the angles of deflection have been plotted as abscissae and as ordinates, the ratio S/S of the variable sensitivity to the maximum sensitivity, the curve 20 corresponds to a low ratio B/A, that is to say a predominance of the influence of the fixed portion over that of the variable portion of the ionisation chamber, and the curve 21 corresponds to a high ratio of B/A.

In the first case, the interval between two indications of the scale (proportional to the slope of the curve 20) varies only slightly, except towards the end, along the said scale, whilst on the other hand, in the second case, the variation is much greater along the scale.

The ionisation chamber of an electrometer is however not very sensitive to small intensities of radiation, and for that reason it may be preferable to connect in parallel with this chamber, that is to say to the terminals of the electrometer, a device which is more sensitive to radiations of low value and, in particular, a Geiger-Muller counter chosen in accordance with the nature of the radiations. In this case however, the said counter is no longer polarised with a constant potential, as in the case of its normal uses, but by a variable potential which is that of the electrometer.

Now a Geiger counter can only operate when its potential is comprised between two limits, upper and lower, which are characteristic of the type of counter considered. It will be recalled that the lower limit corresponds to the possibility of the beginning of a discharge and the upper limit to the spontaneous extinction of that discharge. These limits, which are fairly close together, when read on the electrometer will thus constitute the extremities of the graduation of the instrument.

In order to overcome this drawback, the counter is used beyond the upper limit of potential (auto-extinction) and it is polarised by the electrometer capacity (the capacity of the electrometer or the capacity connected in parallel with the electrometer), through a resistance of high value connected in series with the filament.

Thus, on the commencement of a discharge, by reason of the time-constant (R.C.) of the system formed by the inherent capacity of the counter, the resistance and the capacity of the electrometer, the potential drops sufficiently at the terminals of the counter for the extinction to be obtained. This arrangement has the additional advantage of providing for an integration of the discharge impulses which appear in the counter. In fact, each very short discharge impulse derives its energy from the inherent capacity of the counter. The counter is re-charged by the capacity of the electrometer through the said high resistance. Since the time-constant of this resistance-capacity circuit is chosen to be greater than the duration of the discharge, the variations of potential at the terminals of the electrometer capacity are spread out in time with respect to the discharge impulses.

Figure 8:
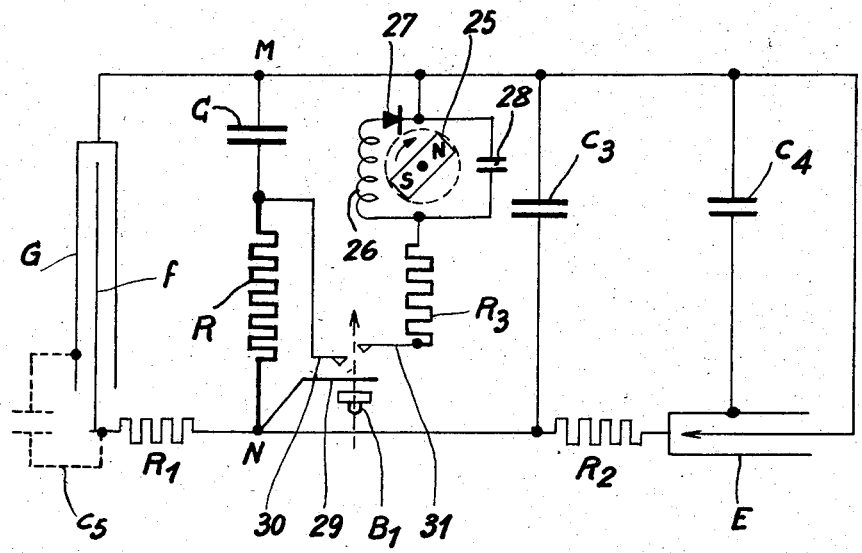
Fig. 8 is a diagram of an apparatus employing a member which is sensitive to the radiations, in parallel with the electrometer.

Fig. 8 shows a circuit arrangement of this kind. The condenser C which constitutes the source of substantially constant potential is connected in series with the high resistance R. At the extremities M and N of this series connection are connected in parallel, on the one hand a Geiger-Muller counter G, the filament $f$ of which is in series with a resistance $R_1$, and on the other hand the electrometer E. The electrometer connection is shunted by the electrometer capacity $C_3$ and the electrometer E itself is connected to the terminals of this capacity $C_3$ by the network $R_2C_4$. The resistance $R_2$ is in series with the electrometer and the capacity $C_4$ is directly in parallel with the electrometer.

The apparatus is completed by a magneto arranged for actuation by hand, which comprises a rotating magnet 25, a fixed armature 26 and a device which converts the alternating current from this magneto to direct current, the device comprising the rectifier 27 and the condenser 28. In series with the magneto is connected a high resistance $R_3$.

The internal connections of the apparatus can be modified by means of a push-button, the construction of which is similar to that shown in Fig. 6. This push-button $B_1$ acts on an elastic tongue 29 which, when deformed by the said button, can touch in succession the elastic contact 30, which is directly connected to the armature of the condenser C opposite to the point M and, at the same time, the contact 30 and the contact 31 which forms the extremity of the resistance $R_3$.

When the button $B_1$ is fully depressed (position I), the three contact members 29, 30, 31 make contact with each other, which means that the very high resistance R is short-circuited and that the terminals of the magneto are respectively connected to the armatures of the different condensers C, $C_3$ and $C_4$. By rotating the magneto, it is thus possible to charge these three condensers simultaneously and to bring the electrometer to its maximum charge which is the origin of the graduation. The resistance $R_3$, in co-operation with the rectifier device, prevents the discharge of these condensers when the button $B_1$ is released and rotation of the magneto is stopped. When the button $B_1$ is fully released (position II), the three contact members 29, 30, 31 are insulated from each other and the apparatus is in the electrical position shown in the diagram. Finally, in position III, it is possible to cause only the contact members 29 and 30 to make contact, which effects the short-circuiting of the resistance R.

As has already been indicated, the position I is used only for the charge of the apparatus. When the latter is in the position II it measures the intensity of the ionising radiations to which the counter G is subjected. In fact, in this position, the condenser C of high value and the charge of which varies very little during the course of the measurments of intensity, acts as a supply source for the circuit.

The condenser C charges the capacity $C_3$ of the electrometer through the resistance R, the capacity $C_3$ determining the potential obtaining at the point M and N, that is to say the potential of the counter G and that of the electrometer E. When an ionising particle (photon, electron, neutron, etc.) reaches the counter G, a short discharge is produced in the counter G and by reason of the presence of the resistance $R_1$, the capacity $C_3$ cannot restore instantaneously the polarisation of the counter, so that this discharge does not persist and is extinguished. But, in consequence, the potential between the points M and N, or in other words the potential at the terminal of $C_3$, which is that which the electrometer E finally measures, depends on the one hand on the speed at which the condenser C can re-charge the capacity $C_3$ and, on the other hand, on the speed with which the said capacity $C_3$ is discharged by the counter G.

Since the potential of the capacity C remains practically constant, and the resistance R is also a constant element, the potential between M and N thus depends only on the speed of discharge of the capacity $C_3$, that is to say on the intensity of the ionising radiation and, in consequence, the electrometer E gives the measurement of this intensity.

It will be noted that the higher the intensity of the radiations the greater the instantaneous drop in potential at the terminals of the electrometer capacity $C_3$ and, in consequence, as the potential of this capacity is that which polarises the counter through the resistance $R_1$, a further increase in intensity of the radiations has then, on the other hand, only a small effect on the potential of the said capacity. The graduations of the electrometer are thus very widely spaced for small intensities and are on the contrary very close together for high intensities, which do not require to be measured with great absolute precision.

The electrometer may thus be directly connected to the terminals of the capacity $C_3$, or alternatively this capacity $C_3$ could be replaced by that of the electrometer itself. However, especially when the radiation to be measured is low, the variation in potential between M and N is subjected to a fluctuation every time an ionising particle reaches the counter. In order to dampen these fluctuations, the electrometer E is connected, as shown in Fig. 8, to the terminals of the capacity $C_3$ through the network $R_2C_4$. In this case, it can also be considered that $C_3$, $C_4$ and $R_2$ form a $\pi$ filter which absorbs the fluctuations of potential and only allows to pass the continuous aperiodic potentials.

When the button $B_1$ is partly depressed, that is to say when the members 21 and 30 only are in contact, the electrometer measures directly the potential at the terminals of the condenser C (the capacity of $C_3$ being negligibly small with respect to that of C), that is to say it measures the total discharge of this condenser under the effect of the ionising radiations which act on the counter. The apparatus thus functions directly as a quantity meter.

However, contrary to the embodiment shown in Fig. 3, the two functions of the apparatus (measurement of the quantity and measurement of the intensity) cannot be used alternatively and the apparatus, the connections of which are shown in Fig. 8, can only measure either the one or the other of these two magnitudes, since the same condenser C is substituted for the two condensers $C_1$ and $C_2$ shown in Fig. 3.

The following example of construction will give an idea of the possibilities of an apparatus constructed in conformity with Fig. 8. In an experimental apparatus, the condenser C had a capacity of 0.6 $\mu$F and the two condensers $C_3$ and $C_4$ a capacity of 200 pF. The resistance R was chosen with a value of $10^{10}$ ohms, the resistance $R_1$ was 10 megohms and the resistance $R_2$ 100 megohms. In other words, the resistance R was 100 times greater than the resistance $R_2$ and 1,000 times greater than the resistance $R_1$. The counter was a standard Geiger-Muller counter of the halogen type (bromine). The electrometer gave a full scale deflection for a potential of 500 volts.

An apparatus of this kind can measure intensities comprised between 0.5 and 1,000 times the value of the intensity of normal cosmic radiation at the surface of the earth. In practice, intensities of radiation of the order of 50 to 100 times that of normal cosmic radiation can be measured for ten minutes approximately without it being necessary to re-charge the condenser C.

If the apparatus is used as a quantity meter, by recording the time necessary for its complete discharge, it is possible in addition, very easily to evaluate intensities of the order of 100 to 50,000 times the normal intensity of cosmic radiation.

In the embodiments which have been described, the inherent capacity of the counter G conditions the sensitivity of the apparatus, since it is this capacity which is discharged every time the counter operates. In order to increase the sensitivity of the apparatus, it is thus of advantage to increase this capacity, for example by connecting a very small condenser $C_5$, as shown in dotted lines, between the terminals of the counter. However, the total capacity of the counter should remain sufficiently small for the action of the resistance $R_1$ to permit of the extinction of the discharge of this counter.

It will of course be understood that modifications can be made to the forms of embodiment which have been described above, in particular by the substitution of equivalent technical means, without thereby departing from the spirit or from the scope of the present invention.

What I claim is:

1. A dose-rate measuring apparatus for ionizing radiations comprising a fluid tight casing having a fluid dielectric therein and having at least one internally conductive wall; an electrometer having at least one pair of electrodes insulated and movable with respect to one another, one of said electrodes being electrically connected to said conductive wall; a double throw switch having two output terminals, said switch being connected to the other electrode, operable from outside of the casing and biassed toward one of said output terminals; a condenser of small capacity connected between said last mentioned output terminal and said wall; a resistor of large resistance in series with a condenser of large capacity connected between the other output terminal and the wall of said casing; means providing a flow of current between said electrodes varying as the dose-rate of said radiations, and means operative through the wall of said casing for alternately charging said condensers to a given voltage, in respective positions of said switch.

2. A dose-rate measuring apparatus according to claim 1 wherein said electrometer is a quadrant electrometer and wherein the casing forms with said electrometer an ionization chamber.

3. A dose-rate measuring apparatus according to claim 1 wherein said last-mentioned means comprises an insulating frame tightly bordering an aperture of said casing, said frame having a resilient distortable closure of conductive material making contact when distorted with the connection between said other electrode and said double throw switch, and a grounded source of current of given voltage having a conductive projection for distorting said closure.

4. A dose-rate measuring apparatus according to claim 1 wherein said biassed double throw switch comprises a resilient, distortable, insulating diaphragm closing an aperture of said casing; a resilient conductive blade, one end of which is connected to the electrometer and is insulatingly and internally carried by said casing, the median part of which is in close proximity to said diaphragm and to two electrical contacts each on one side of the other end of said blade, the contact nearer the casing wall being in contact relationship with the end of said blade owing to the resilience thereof.

5. In a portable self-contained combination radiological dose-rate and integrated dose meter, a sealed electrically conductive casing, an electrometer having an inherent small but finite capacitance connected at one of its terminals to said casing, a first condenser having a capacitance several orders of magnitude greater than that of said electrometer connected at one of its terminals to said casing, a series combination of a high resistance and a second condenser connected at one of its terminals to said casing, said second condenser having a capacitance several orders of magnitude greater than that of said first condenser; a two-position switch for selectively connecting the other terminal of said electrometer selectively to the other terminal of either said first condenser or said series combination, and means including an insulated portion of said casing for connecting a charging source external to said casing between said casing and the common terminal of said switch.

6. A meter in accordance with the preceding claim, in which said switch is of the single-pole double throw type, with its movable element normally biased to connect the electrometer to said first condenser.

References Cited in the file of this patent

UNITED STATES PATENTS

| | | |
|---|---|---|
| 2,668,245 | Rich | Feb. 2, 1954 |
| 2,676,270 | Lahti | Apr. 20, 1954 |
| 2,683,222 | Failla et al. | July 6, 1954 |
| 2,760,080 | Robinson | Aug. 21, 1956 |